United States Patent
Tailliet (10) Patent No.: US 12,504,461 B2
(45) Date of Patent: Dec. 23, 2025

(54) AGING PROOF DELAY CIRCUIT

(71) Applicant: STMicroelectronics International N.V., Geneva (CH)

(72) Inventor: Francois Tailliet, Fuveau (FR)

(73) Assignee: STMicroelectronics International N.V., Geneva (CH)

( * ) Notice: Subject to any disclaimer, the term of this patent is extended or adjusted under 35 U.S.C. 154(b) by 323 days.

(21) Appl. No.: 18/206,192

(22) Filed: Jun. 6, 2023

(65) Prior Publication Data

US 2024/0410932 A1 Dec. 12, 2024

(51) Int. Cl.
 *G01R 31/26* (2020.01)
 *G01R 19/165* (2006.01)

(52) U.S. Cl.
 CPC ... *G01R 31/2642* (2013.01); *G01R 19/16519* (2013.01); *G01R 19/16576* (2013.01)

(58) Field of Classification Search
 CPC .......... G01R 31/2642; G01R 19/16519; G01R 19/16576
 USPC .................................... 324/762.09
 See application file for complete search history.

(56) References Cited

U.S. PATENT DOCUMENTS

| | | | |
|---|---|---|---|
| 9,484,892 | B1 | 11/2016 | Kakoee et al. |
| 10,746,781 | B2 * | 8/2020 | Bernstein ........... G01R 31/2642 |
| 2014/0312961 | A1 | 10/2014 | Seo |
| 2015/0277393 | A1 | 10/2015 | Liu et al. |
| 2016/0351250 | A1 | 12/2016 | Narayanan et al. |
| 2022/0416772 | A1 | 12/2022 | Fujimoto |

OTHER PUBLICATIONS

Janai, Meir, et al.: "Charge Gain, NBTI Recovery and Random Telegraph Noise in Localized-Trapping NVM Devices," 2011 IEEE, 5 pgs.

* cited by examiner

*Primary Examiner* — Eman A Alkafawi
*Assistant Examiner* — Rahul Maini
(74) *Attorney, Agent, or Firm* — Crowe & Dunlevy LLC (57) ABSTRACT

Disclosed herein is a detector circuit including a first detector configured to receive an input signal and generate a first detector output signal indicative of the input signal having reached a first activation threshold and a second detector configured to receive the input signal and, when enabled by the first detector output signal, generate a second detector output signal indicative of the input signal having reached a second activation threshold. A logic circuit is configured to perform a logical operation on the first and second detector output signals to generate an output indicative of the input signal having reached a voltage equal to the second activation threshold.

17 Claims, 7 Drawing Sheets

AGING PROOF DELAY CIRCUIT

TECHNICAL FIELD

This disclosure is related to the field of threshold detector circuits, the effect of MOS transistor aging on those threshold detectors circuits, and techniques for proofing threshold circuits against the effect of MOS transistor aging.

BACKGROUND

Metal-Oxide-Semiconductor Field-Effect Transistors (MOS transistors) are a common building block of integrated circuits (ICs) and, as such, are in wide use. Despite their widespread use due to their versatility and usefulness, MOS transistors are not without issues, such as that of aging. Aging refers to the gradual degradation of the electrical properties of the MOS transistor over time, leading to performance loss and, potentially, the failure of the circuits formed from MOS transistors to function as intended.

Aging in MOS transistors is primarily caused by four mechanisms, namely Hot Carrier Injection (HCI), Negative Bias Temperature Instability (NBTI), Positive Bias Temperature Instability (PBTI), and Time-Dependent Dielectric Breakdown (TDDB).

HCI occurs when high-energy charge carriers (electrons or holes) are generated in the channel of the transistor due to high electric fields. These carriers can overcome the energy barrier and become injected into the gate oxide, causing the formation of interface traps and oxide charge trapping. HCI is particularly problematic in short-channel transistors, where the electric fields are more significant, and when the gate voltage (VG) is near half of the drain voltage (VD/2). The resulting effects of HCI include threshold voltage shifts, reduced transconductance, and increased leakage currents.

NBTI is a degradation mechanism primarily affecting p-channel MOS transistors. It occurs when the transistor is subjected to negative gate-to-source voltages (Vgs) and elevated temperatures. Under these conditions, hydrogen is released from the silicon dioxide ($SiO_2$) layer, creating interface traps and oxide charge trapping. The effects of NBTI include threshold voltage shifts (e.g., threshold voltage increase, leading to reduced drain currents), reduced transconductance, and increased leakage currents (which is similar to HCI).

PBTI is a degradation mechanism that affects n-channel MOS transistors. It occurs when the transistor is subjected to a very positive gate-to-source voltage (VGS) and elevated temperatures. Like NBTI, PBTI also involves the release of hydrogen from the silicon dioxide ($SiO_2$) layer, resulting in interface traps and oxide charge trapping. The effects of PBTI include threshold voltage shifts, reduced transconductance, and increased leakage currents.

TDDB refers to the gradual degradation of the gate oxide in MOS transistors due to the presence of high electric fields and increased temperatures. Over time, the gate oxide can weaken, leading to the formation of conductive paths and eventual dielectric breakdown. The effects of TDDB include increased gate leakage currents, threshold voltage shifts, and reduced transconductance.

EEPROM (Electrically Erasable Programmable Read-Only Memory) devices are particularly susceptible to the negative effects of MOS transistor aging. These memory devices are typically specified to operate within a wide power supply (Vdd) range, usually between 1.6V and 5.5V. At the upper end of this range (5.5V), MOS transistors can experience accelerated aging, while at the lower end of this range (1.6V), a higher drift of drain current levels can occur. These aging effects can lead to chip drift and, in the worst case, result in the non-functionality of the EEPROM device.

Among the aging mechanisms, NBTI is identified as the largest concern for EEPROM devices, particularly for p-channel MOS transistors. After 1000 hours of operation at a gate-to-source voltage (VGS) of −6V, for example, the threshold voltage (Vt) of a p-channel MOS transistor can increase from −0.8V to −1.0V, significantly impacting the performance and reliability of the EEPROM memory.

Timer circuits are also rather susceptible to the negative effects of MOS transistor aging. Such timer circuits are generally based on the charging time of a capacitor. The capacitor is charged at a certain rate, and the detection of the end of charging determines the time elapsed. However, aging may affect the threshold for detection of the end of charging, which can lead to inaccuracies in the operation of the timer.

Figure 1:
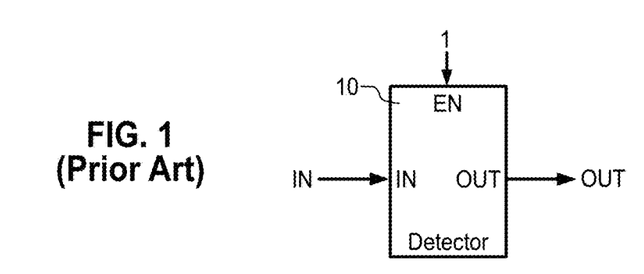
FIG. 1 is a block diagram of a known detector used to detect the end of the charging of a capacitor in a timer circuit.

Refer now to FIG. 1, showing a prior art detector 10 used to detect the end of the charging of a capacitor in a timer circuit. The input IN to the detector 10 is the charge across the capacitor and the output OUT of the detector is asserted once the input IN has crossed the detection threshold of the detector 10. The "setpoint" of the timer circuit is a predetermined voltage threshold to which the capacitor is charging, at which point the detector 10 is intended to assert its output, indicating the end of the charging process, with the time taken for the capacitor to charge from its initial voltage to the setpoint determining the time interval that the timer circuit is intended to measure.

Figure 2A:
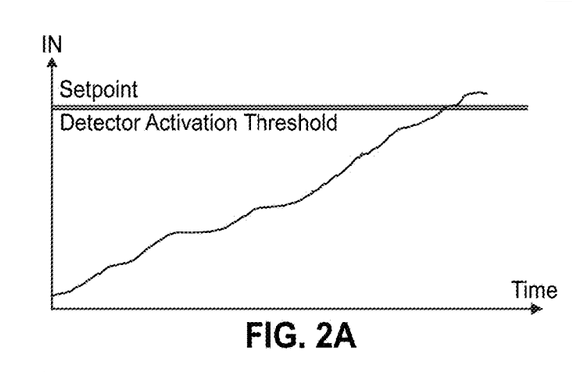
FIGS. 2A-2B are graphs of the input and output of the detector of FIG. 1 during operation, prior to aging of one or more MOS transistors in the detector.
Figure 2B:
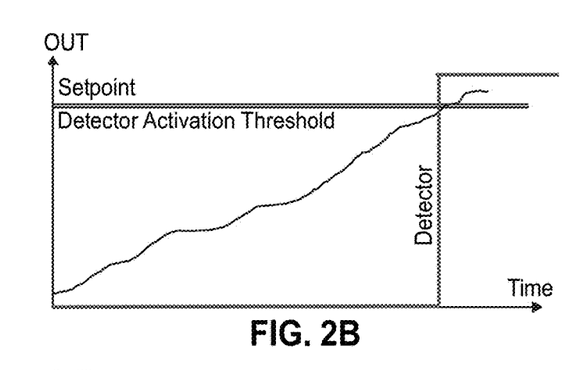
Figure 3A:
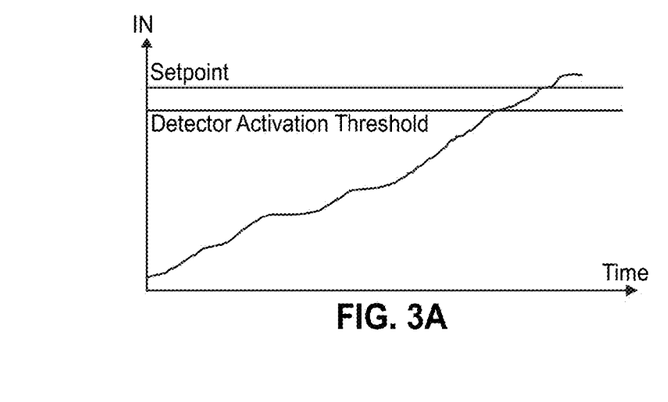
FIGS. 3A-3B are graphs of the input and output of the detector of FIG. 1 during operation, after aging of one or more MOS transistors in the detector.
Figure 3B:
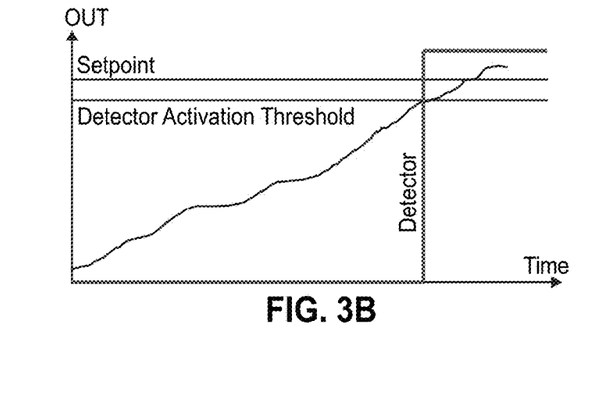

Before deleterious aging of one or more MOS transistors in the detector 10, the detector 10 works as expected and switches near the setpoint (i.e., its activation threshold is near the setpoint), meaning that it accurately detects when the capacitor in the timer circuit reaches the predetermined voltage threshold. This can be observed in FIGS. 2A-2B showing operation of the detector 10 prior to MOS transistor aging, it can be seen that the detector activation threshold is near or substantially at the setpoint. However, after such aging of one or more MOS transistors in the detector 10, the detector 10 may now switch below the setpoint. This can be observed in FIGS. 3A-3B showing operation of the detector 10 after MOS transistor aging, where it can be seen that the detector activation threshold is well below the setpoint. As a result, the output OUT is asserted before the input IN (the voltage across the capacitor) has reached the setpoint, meaning that the time interval being measured is now shorter than intended.

One approach to mitigating the negative effects of MOS transistor aging in timer circuits is to limit the supply voltage of the timer circuit to a value where aging effects are reduced. This restriction can help minimize the aging of the MOS transistor(s) used in charging the capacitor in the timer. However, as stated, while lower supply voltages cause a slower rate of MOS transistor aging, the effects of such aging (once the aging occurs) is more pronounced at lower supply voltages.

Another approach is to design the timer circuit to pair a capacitor charged at a constant current with a stable end-of-charge voltage detection mechanism to help maintain consistent timer operation. However, this has several disadvantages, including the fact that the constant current charging and stable voltage detection system draws standby current, which can affect the overall power efficiency of the device, and that the implementation can be complex and area-consuming. Still further, achieving a truly aging-stable voltage detection is not guaranteed with this approach. Aging-induced fluctuations in the detection threshold can still occur, potentially affecting the performance and reliability of the timer over time.

In certain applications, EEPROMs are used to store data that is to be accessed, modified, or updated at specific intervals or under specific conditions. Timers can be utilized to control these processes by providing that the appropriate time has elapsed before initiating the next read, write, or erase operation. For example, a timer can be used to control the timing of EEPROM write cycles, providing for the passage of the minimum required time before attempting a write operation.

Since both EEPROMs and timers are susceptible to MOS transistor aging, the performance and reliability of these components may be interconnected. As such, aging-induced degradation of MOS transistors can affect not only the direct operation of EEPROMs but also the accurate functioning of the timers responsible for controlling their access and modification.

Given that the above-described known solutions for addressing MOS transistor aging in timer circuits are inadequate for the stated reasons, further development is needed with the aim of producing a timer circuit that remains unaffected by MOS transistor aging.

SUMMARY

Disclosed herein is a detector circuit including a first detector configured to receive an input signal and generate a first detector output signal indicative of the input signal having reached a first activation threshold, and a second detector configured to receive the input signal and, when enabled by the first detector output signal, generate a second detector output signal indicative of the input signal having reached a second activation threshold. A logic circuit is configured to perform a logical operation on the first and second detector output signals to generate an output indicative of the input signal having reached a voltage equal to the second activation threshold.

The second activation threshold may be greater than the first activation threshold due to aging of at least one MOS transistor in the first detector.

The voltage equal to the second activation threshold may be a desired voltage level across a capacitor of a timer.

The logic circuit may be an AND gate configured to perform a logical AND operation on the first and second detector output signals to assert an output indicative of the input signal having reached a voltage equal to the second activation threshold.

A timing circuit may be configured to charge the capacitor in response to assertion of the input signal. In this instance, the detector circuit may also include an aging mitigation circuit with a first inverter having its input connected to receive the first detector output and providing a first inverter output. The aging mitigation circuit may include the second detector, with the second detector including a first p-channel transistor having a source and a bulk connected to receive the first inverter output, a drain connected to a first tap node, and a gate connected to receive the voltage on the capacitor, and a first n-channel transistor having a drain connected to the first tap node, a source connected to ground, and a gate connected to receive a reference voltage. The aging mitigation circuit may also include a second p-channel transistor having a source connected to a supply voltage, a drain connected to a second tap node, and a gate connected to receive the first inverter output, and a second n-channel transistor having a drain connected to the second tap node, a source connected to ground, and a gate connected to receive the reference voltage. The logic circuit may perform the logical operation on the first and second detector outputs by receiving inputs from the first and second tap nodes and generating an output signal as well as discharging the capacitor based thereupon.

The first detector may include a third p-channel transistor having a source connected to the supply voltage, a drain connected to a third tap node, and a gate connected to receive the voltage on the capacitor, and a third n-channel transistor having a drain connected to the third tap node, a drain connected to ground, and a gate connected to receive the reference voltage.

The first inverter may have its input connected to the third tap node and its output connected to the gate of the second p-channel transistor.

The logic circuit may include an OR gate having a first input connected to the second tap node, a second input connected to the first tap node, and an output, a first NAND gate having a first input connected to the output of the OR gate, a second input connected to a pre-output node, and an output, and a second NAND gate having a first input connected to the output of the first NAND gate, a second input connected to receive the input signal, and an output connected to the pre-output node.

The logic circuit may also include a third NAND gate having a first input connected to receive the input signal, a second input connected to the pre-output node, and an output connected to the timing circuit.

A timing circuit may be configured to charge the capacitor in response to assertion of the input signal. In this instance, the detector circuit may further include an aging mitigation circuit with an inverter circuit having its input connected to receive the first detector output and providing a first inverter output, and the second detector. The second detector may include a first p-channel transistor having a source and a bulk connected to receive the first inverter output, a drain connected to a first tap node, and a gate connected to receive the voltage on the capacitor, and a first n-channel transistor having a drain connected to the first tap node, a source connected to ground, and a gate connected to receive a reference voltage. The aging mitigation circuit may further include a second p-channel transistor having a source connected to a supply voltage, a drain connected to the first tap node, and a gate connected to receive the first inverter output. The logic circuit may perform the logical operation on the first and second detector outputs by receiving inputs from the first tap node and generating an output signal as well as discharging the capacitor based thereupon.

The first detector may include a third p-channel transistor having a source connected to the supply voltage, a drain connected to a second tap node, and a gate connected to receive the voltage on the capacitor, and a third n-channel transistor having a drain connected to the second tap node, a drain connected to ground, and a gate connected to receive the reference voltage.

The inverter circuit may include a series of cascaded inverters connected between the second tap node and the gate of the second p-channel transistor.

Method aspects are also disclosed herein. For example, a method may include receiving an input signal at a first detector, generating a first detector output signal when the input signal reaches a first activation threshold, enabling a second detector with the first detector output signal and generating a second detector output signal when the input signal reaches a second activation threshold, and performing a logical operation on the first and second detector outputs to generate an output indicative of the input signal having reached a voltage equal to the second activation threshold.

The second activation threshold may be greater than the first activation threshold due to aging of at least one MOS transistor in the first detector.

The voltage equal to the second activation threshold may correspond to a desired voltage level across a capacitor of a timer.

The logical operation performed on the first and second detector outputs may be a logical AND operation, and the output indicative of the input signal having reached a voltage equal to the second activation threshold may be asserted when both the first and second detector outputs are asserted, with the second activation threshold being greater than the first activation threshold due to aging of at least one MOS transistor in the first detector.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

This disclosure focuses on mitigating the negative effects of MOS transistor aging, such as NBTI caused aging, on timers responsible for determining parameters in electronic systems such as those that involve EEPROMs. These parameters may include the I2C filter time constant and the write cycle time. By addressing the drift caused by NBTI aging in the timer circuit, consistent and reliable operation of EEPROMs utilizing these timers can be provided.

Figure 4A:
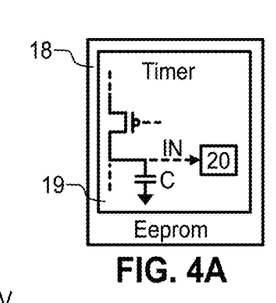
FIG. 4A is a block diagram of an EEPROM disclosed herein.

Now described with reference to FIG. 4A is an EEPROM 18 including a timer 19 with a detector circuit 20 that mitigates the negative effects of MOS transistor aging so that the output OUT of the detector circuit 20 is asserted when (or close to when) the input IN becomes equal to the desired voltage level across the capacitor C of the timer 19.

Figure 4B:
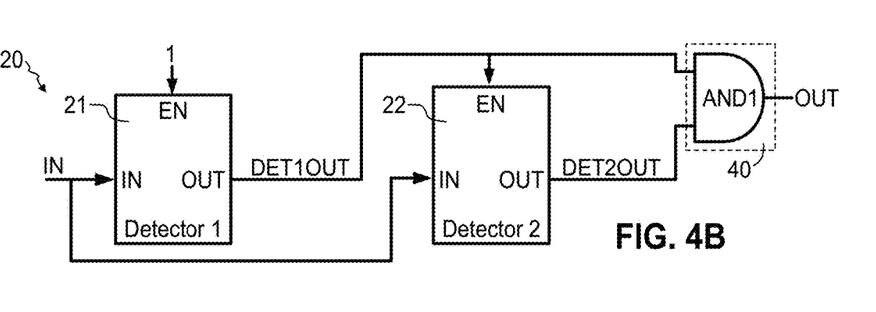
FIG. 4B is a block diagram of the detector circuit of the timer of the EEPROM of FIG. 4A.

As shown in FIG. 4B, the detector circuit 20 includes a first detector 21 and a second detector 22. The first detector 21 receives an input signal IN representative of the voltage across the capacitor C of the timer 19 into which the detector circuit 20 is incorporated and generates a first detector output DET1OUT when the input signal IN reaches the activation threshold of the first detector 21. The second detector 22 likewise receives the input signal IN as input and, when enabled (e.g., powered), generates a second detector output DET2OUT when the input signal IN reaches the activation threshold of the second detector 22. A combinatorial logic circuit 40 (e.g., AND gate AND1) performs a logical operation (e.g., logical AND) on DET1OUT and DET2OUT to generate the output OUT.

Observe, in particular, that while the first detector 21 is set to be enabled (e.g., powered) constantly during operation, the second detector 22 is enabled by DET1OUT. Therefore, the second detector 22 is only enabled (e.g., powered) when DET1OUT is asserted (i.e., is only enabled when the input IN has reached the activation threshold of the first detector 21).

Figure 5A:
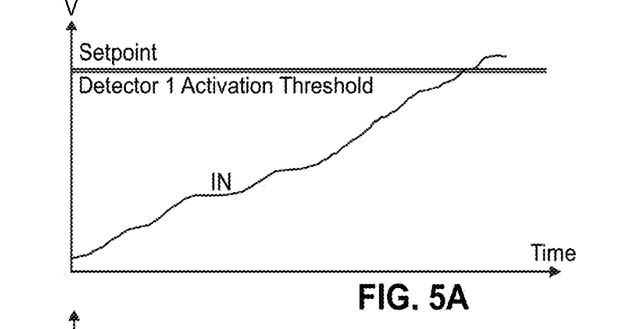
FIGS. 5A-5B are graphs of the input and output of the first detector of FIG. 4B during operation, prior to aging of one or more MOS transistors in the first detector.
Figure 5B:
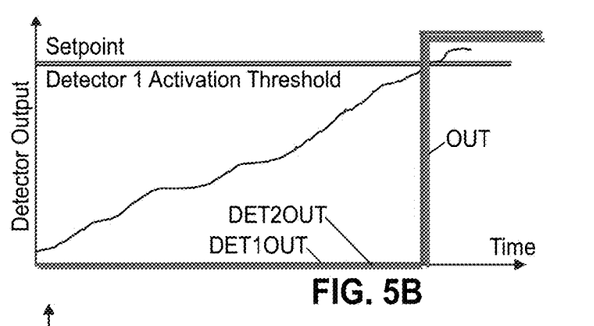
Figure 5C:
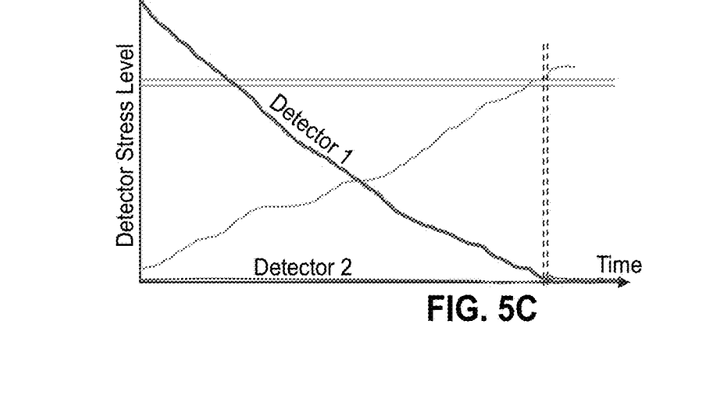
FIG. 5C is a graph of the stress levels of the detectors of FIG. 4B during operation, prior to aging of one or more MOS transistors in the first detector.

As shown in FIGS. 5A-5B, before aging of one or more transistors in the first detector 21, both the first detector 21 and the second detector 22 switch near the setpoint of the timer 19 into which the detector circuit 20 is incorporated, providing for the output OUT to be asserted when the input IN reaches the desired voltage level across the capacitor C of the timer 19. Assume that the stress experienced by MOS transistors in the first detector 21 or second detector 22 (which leads to aging) increases with the difference between the input IN and the setpoint, potentially following an exponential curve, as shown in FIG. 5C. This means that the closer the input IN is to the setpoint, the lower the stress experienced by the first detector 21 and second detector 22.

Figure 5D:
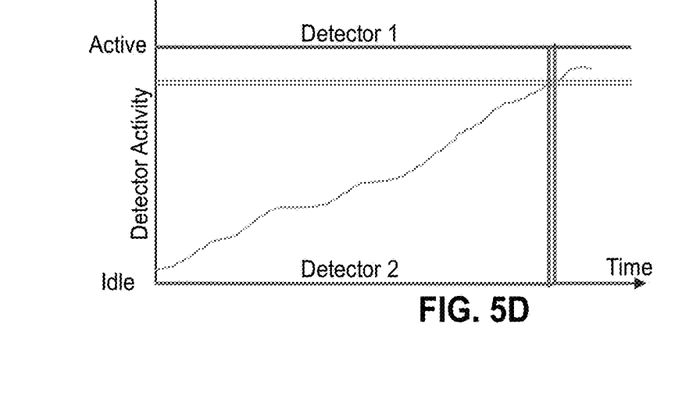
FIG. 5D is a graph of the activity of the detectors of FIG. 4B during operation, prior to aging of one or more MOS transistors in the first detector.

However, as explained above, the second detector 22 is enabled (e.g., powered) only when DET1OUT is asserted, which occurs when the input IN has reached the activation threshold of the first detector 21, as shown in FIG. 5D. This provides for the second detector 22 to remain disabled and unstressed until the input IN meets the setpoint. Consequently, the stress experienced by the second detector 22 is negligible compared to that of the first detector 21, as it is enabled (e.g., powered) for a shorter time and operates in a domain where the input IN is near the setpoint.

The overall switching behavior of the output OUT of the detector circuit 20 is determined by the logical combination of the first detector 21 and the second detector 22. Since the output OUT is only asserted when both the first detector 21 and second detector 22 are asserted, and since the enabling of the second detector 22 occurs only when DET1OUT is asserted to spare the second detector 22 from the stress that the first detector 21 is subjected to (and the consequent aging), the detector 20 maintains accurate and consistent operation even as the MOS transistors within the first detector 21 age.

Figure 6A:
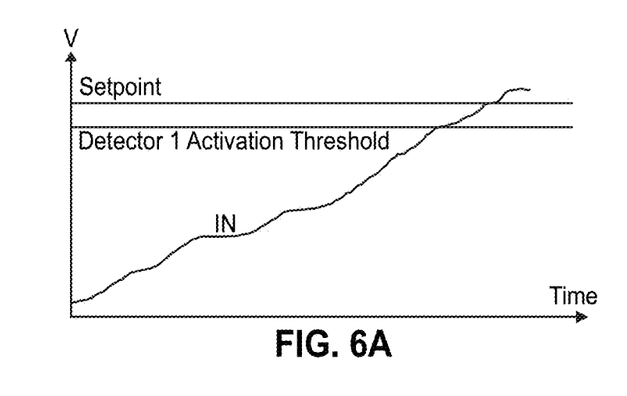
FIGS. 6A-6B are graphs of the input and output of the first detector of FIG. 4B during operation, after aging of one or more MOS transistors in the first detector.
Figure 6B:
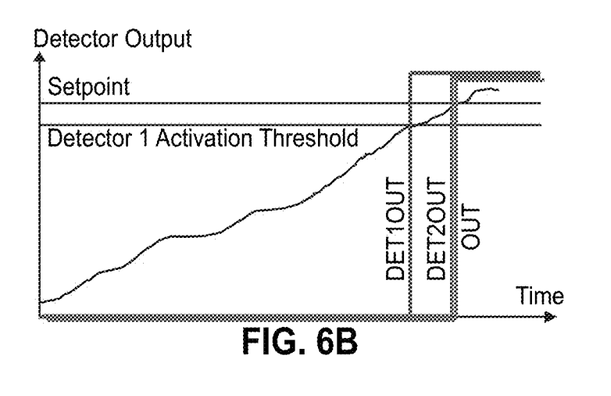
Figure 6C:
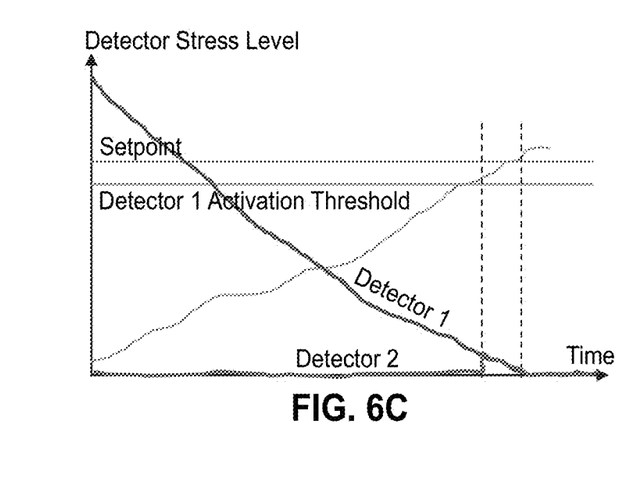
FIG. 6C is a graph of the stress levels of the detectors of FIG. 4B during operation, after aging of one or more MOS transistors in the first detector.
Figure 6D:
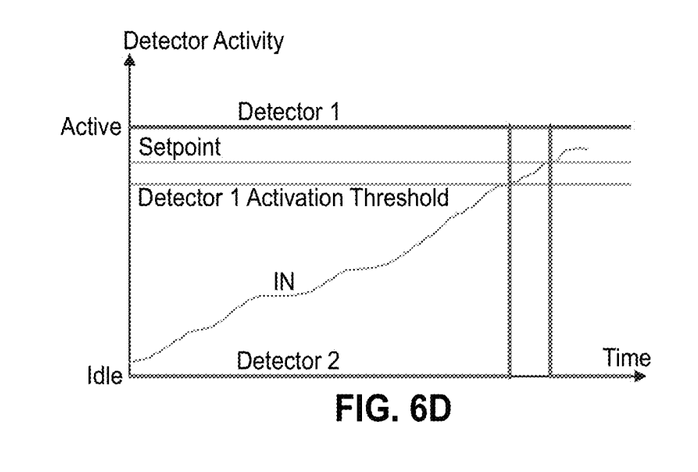
FIG. 6D is a graph of the activity of the detectors of FIG. 4B during operation, after aging of one or more MOS transistors in the first detector.

This proper operation when one or more MOS transistors in the first detector 21 have experienced deleterious aging may be observed in FIGS. 6A-6D. For example, shown in FIG. 6A is the activation threshold of the first detector 21 being lower than the setpoint when aged, and shown in FIG. 6B is that despite DET1OUT being asserted prior to IN reaching the setpoint, OUT is not asserted until IN reaches the setpoint. As explained earlier, and as shown in FIG. 6C, this is due to the fact that the second detector 22 is only subject to low stresses for a short period of time, as DETOUT2 is only enabled when the input IN reaches the activation threshold of the first detector 21.

To generalize even further, this approach can be applied to any threshold detector, extending beyond the detection of a charge in a capacitor to include voltage or current detection thresholds, among other applications (for example, circuit reset or circuit enable operations which are dependent on a voltage measurement and/or comparison operation). In such cases, the threshold detector emits a signal when the threshold is crossed. However, the detector element may suffer from transistor aging when the physical value being measured is significantly below the threshold. This aging consequently reduces the detection threshold of the detecting element. To overcome this issue, a second detector, similar or identical to the first, is added to the system. This second detector remains disabled as long as the first detector has not detected the threshold, preventing it from aging. Once the first detector detects the threshold, the second detector is enabled (e.g., powered) but does not age, as the physical value being measured is close to the threshold. The signal is ultimately issued when both detectors detect the threshold, ensuring accurate detection and improved longevity.

The benefits of this detector circuit design are numerous. By mitigating the negative effects of MOS transistor aging on the detector circuit 20, EEPROM parameters controlled by a timer incorporating the detector circuit 20, such as the I2C filter time constant and the write cycle time, remain consistent and reliable throughout the lifetime of an electronic device incorporating the EEPROM. This enhances the overall performance, reliability, and longevity of the device, reducing the likelihood of failures, data corruption, or other adverse effects.

Figure 7:
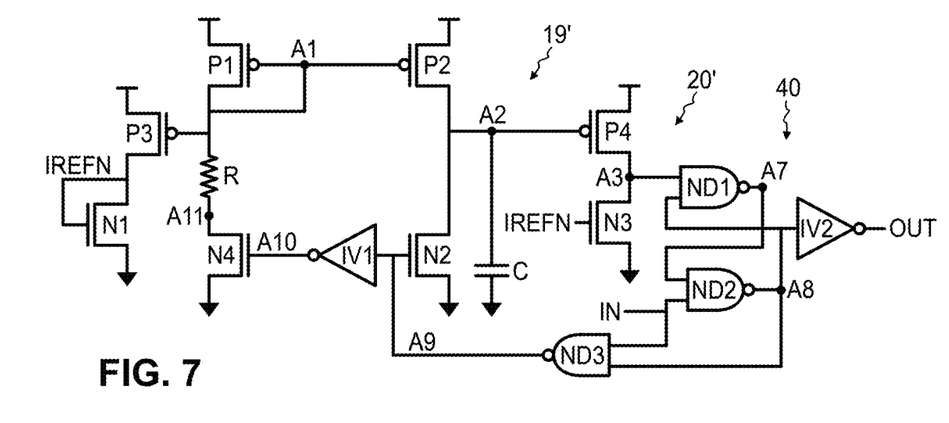
FIG. 7 is a schematic diagram of a timer and associated detector circuit disclosed herein.

Consider now the timer 19' and detector circuit 20' of FIG. 7.

The timer 19' includes a diode coupled n-channel transistor N1 connected between the drain of p-channel transistor P3 and ground, with a source of P3 being connected to a supply voltage and a gate of P3 being connected to node A1. A p-channel transistor P1 has its source connected to the supply voltage, its drain connected to node A1, and its gate connected to node A1. A resistor R is connected between nodes A1 and A11. An n-channel transistor N4 has its drain connected to node A11, its source connected to ground, and its gate connected to node A10. A p-channel transistor P2 has its source connected to the supply voltage, its drain connected to node A2, and its gate connected to node A1. An n-channel transistor N2 has its drain connected to the drain of P2, its source connected to ground, and its gate connected to node A9. An inverter IV1 has its input connected to node A9 and its output connected to node A10. A capacitor C is connected between node A2 and ground.

The detector circuit 20' includes a p-channel transistor P4 with its source connected to the supply voltage, its drain connected to node A3, and its gate connected to node A2. An n-channel transistor N3 has its drain connected to node A3, its source connected to ground, and its gate connected to a reference voltage IREFN generated by the diode coupled transistor N1. A NAND gate ND1 has its first input connected to node A3, its second input connected to node A8, and its output connected to node A7. A NAND gate ND2 has its first input connected to node A7, its second input connected to receive the input IN, and its output connected to node A8. An inverter IV2 has its input connected to node A8 and its output generating the output signal OUT. A NAND gate ND3 has its first input connected to receive the input IN, its second input connected to node A8, and its output connected to node A9.

The operation of the timer 19' and detector circuit 20' of FIG. 7 will now be discussed in general. The timer 19' and detector circuit 20' form a delay circuit in which the output signal OUT transitions from a first logic state (e.g., 0) to a second logic state (e.g., 1) after a time delay T proportional to the product of the resistance of resistor R and the capacitance of capacitor C, and independent of the power supply voltage Vdd. When the input IN transitions from the first logic state (e.g., 0) to the second logic state (e.g., 1), the capacitor C is charged with a current that is approximately equal to (Vdd−VtP)/R, where Vdd is the supply voltage and VtP is the absolute value of the threshold voltage of p-channel transistor P1 (keeping in mind that P1, P2, and P4 have the same threshold voltage). The time delay T is determined by the time it takes to charge the capacitor C from 0 to Vdd−VtP with this charging current, which is given by the equation:

$$T = R \times C$$

However, p-channel transistor P4 is subject to NBTI aging due to its gate voltage following the charge on capacitor C. The aging of p-channel transistor P4 results in an increase in its absolute threshold voltage from Vtp to VtPa. As transistor P4 ages, the delay time Ta is affected and becomes dependent on Vdd. The aged delay time Ta is given by the equation Ta=R×C×(Vdd−VtPa)/(Vdd−VtP), which shows that Ta is less than T. This reduction in the delay time is due to aging of p-channel transistor P4.

For example, if Vdd=1.6V, VtP=0.8V, and VtPa=0.9V, the aged delay time Ta is equal to $$Ta = 0.875 \times R \times C$$

Figure 8:
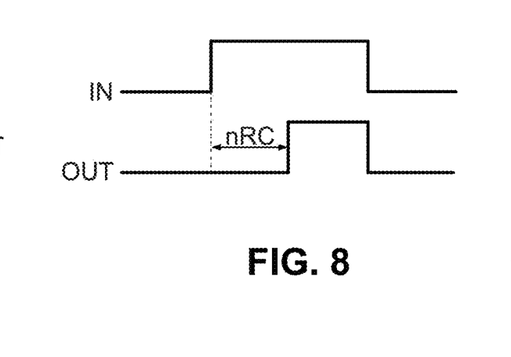
FIG. 8 is a graph showing the delay created by the timer and detector circuit of FIG. 7.

If VtPa reaches 1V, the aged delay time Ta becomes Ta=0.75×R×C, which further highlights the impact of aging on the delay time. The delay time is represented in the graph of FIG. 8, where the delay Ta is shown as nRC, with n being the constant described above (e.g., 0.875, 0.75).

Figure 9:
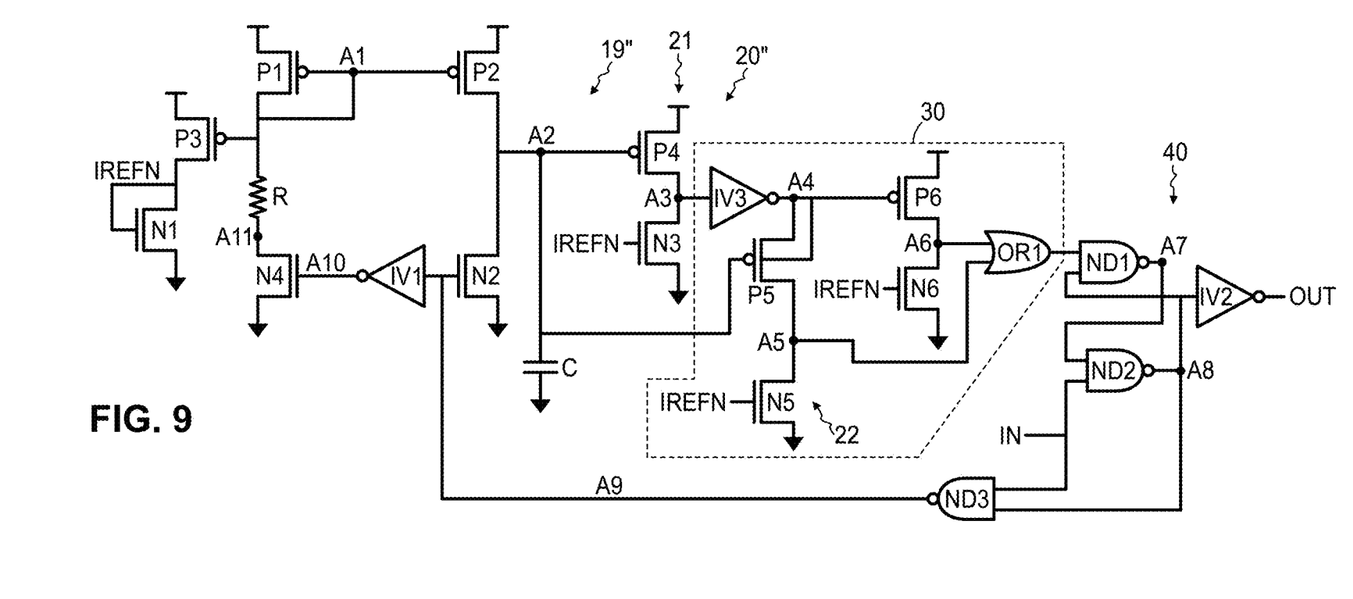
FIG. 9 is a schematic diagram of a timer and associated detector circuit disclosed herein which mitigate the effects of MOS transistor aging.

To address this issue caused by the aging of p-channel transistor P4, the timer 19" and detector circuit 20" of FIG. 9 have been developed. The main difference here over the timer 19' and detector circuit 20' of FIG. 7 is the insertion of an aging protection circuit 30 between node A3 and the first input of NAND gate ND1.

The timer 19" includes a diode coupled n-channel transistor N1 connected between the drain of p-channel transistor P3 and ground, with a source of P3 being connected to a supply voltage and a gate of P3 being connected to node A1. A p-channel transistor P1 has its source connected to the supply voltage, its drain connected to node A1, and its gate connected to node A1. A resistor R is connected between nodes A1 and A11. An n-channel transistor N4 has its drain connected to node A11, its source connected to ground, and its gate connected to node A10. A p-channel transistor P2 has its source connected to the supply voltage, its drain connected to node A2, and its gate connected to node A1. An n-channel transistor N2 has its drain connected to node A2, its source connected to ground, and its gate connected to node A9. An inverter IV1 has its input connected to node A9 and its output connected to node A10. A capacitor C is connected between node A2 and ground.

The detector circuit 20' includes a p-channel transistor P4 with its source connected to the supply voltage, its drain connected to node A3, and its gate connected to node A2. An n-channel transistor N3 has its drain connected to node A3, its source connected to ground, and its gate connected to a reference voltage IREFN generated by the diode coupled transistor N1. The p-channel transistor P4 and n-channel transistor N3 can be considered to form a first detector.

The aging protection circuit 30 is now described and includes an inverter IV3 having its input connected to node A3 and its output connected to node A4. A p-channel transistor P5 has its source connected to node A4, its bulk connected to node A4, its drain connected to node A5, and its gate connected to node A2. An n-channel transistor N5 has its drain connected to node A5, its source connected to ground, and its gate connected to the reference voltage IREFN. A p-channel transistor P6 has its source connected to the supply voltage, its drain connected to node A6, and its gate connected to node A4. An n-channel transistor N6 has its drain connected to node A6, its source connected to ground, and its gate connected to the reference voltage IREFN.

P-channel transistor P5 may be a replica of p-channel transistor P4, and n-channel transistor N5 may be a replica of n-channel transistor N3. For example, p-channel transistors P5 and P4 may have the same width to length ratio, may have the same doping levels, the same gate oxide thicknesses, etc. Similarly, n-channel transistors N5 and N3 may have the same width to length ratio, may have the same doping levels, the same gate oxide thicknesses, etc.

An OR gate OR1 has its first input connected to node A6, its second input connected to node A5, and its output connected to the first input of NAND gate ND1. The second input of NAND gate ND1 is connected to node A8 and the output of NAND gate ND1 is connected to node A7. A NAND gate ND2 has its first input connected to node A7, its second input connected to receive the input IN, and its output connected to node A8. A NAND gate ND3 has its first input connected to receive the input IN, its second input connected to node A8, and its output connected to node A9. NAND gates ND1-ND3 form a combinatorial logic circuit 40.

This detector circuit 20" does not aim to avoid the aging of p-channel transistor P4 but instead cascades a second detector (p-channel transistor P5, n-channel transistor N5) to effectively detect the charge of capacitor C, the second detector being powered only when the first detector (p-channel transistor P4, n-channel transistor N3) has detected the charge of capacitor C.

Prior to aging of p-channel transistor P4, both detectors switch when the voltage at node A2 becomes equal to Vdd−VtP, with Vdd being the supply voltage and VtP being the threshold voltage of P4.

However, when p-channel transistor P4 is aged, the first detector (p-channel transistor P4, n-channel transistor N3) switches when the voltage at node A2 becomes equal to Vdd−VtPa, with VtPa being the aged threshold of p-channel transistor P4, while the second detector (p-channel transistor P5, n-channel transistor N5) switches when the voltage at node A2 becomes equal to Vdd−VtP, since p-channel transistor P5 has not aged, as it is protected from aging by only turning on once p-channel transistor P4 has turned on.

In the aged device scenario therefore, when the input IN goes to the second logic state (e.g., a logic 1), capacitor C is progressively charged. The voltage at node A3 goes to ground after a period equal to the aged delay time Ta, which is greater than the delay time T prior to aging, as explained above, and is given by the equation:

$$Ta = R \times C \times (Vdd - VtPa)/(Vdd - VtP)$$

At this point, the output of inverter IV3 raises the voltage at A4 and supplies current to the source of p-channel transistor P5, which turns on because its threshold voltage is VtP and its gate to source voltage |Vgs| is VtPa, which is greater than VtP. The gate to source voltage of p-channel transistor P5 is VtPa because its gate will be at the voltage of node A2 while its source will be at the voltage of node A2 less the threshold voltage of p-channel transistor P4, which is VtPa. Once p-channel transistor P5 is turned on, the voltage at node A5 therefore follows the voltage at node A4.

The OR gate OR1 is connected between node A6 and the first input of the NAND gate ND1 to prevent the toggle flip-flop (e.g., NAND SR latch) formed by NAND gates ND1 and ND2 from switching when the voltage at A5 is at ground prior to p-channel transistor P5 turning on.

As long as the voltage at node A4 is at ground, the p-channel transistor P6 is on and forces node A6 to the supply voltage Vdd. When the voltage at node A4 rises, the p-channel transistor P6 turns off and the n-channel transistor N6 pulls the voltage at A6 to ground. This arrangement exists because the voltage at node A6 should go to ground after the voltage at node A5 rises to prevent the voltages at nodes A5 and A6 from both being at ground simultaneously, which would immediately switch the toggle flip-flop formed by NAND gates ND1 and ND2.

Thus, in the aged device scenario, the first input of the OR gate OR1 receives the same input, with the same timing, as it does in the non-aged device scenario. The aging protection circuit can therefore be said to compensate for the aging of p-channel transistor P4 by providing for the first input of the OR gate OR1 to be provided with the same input, with the same timing, regardless of aging of the p-channel transistor P4.

Figure 10:
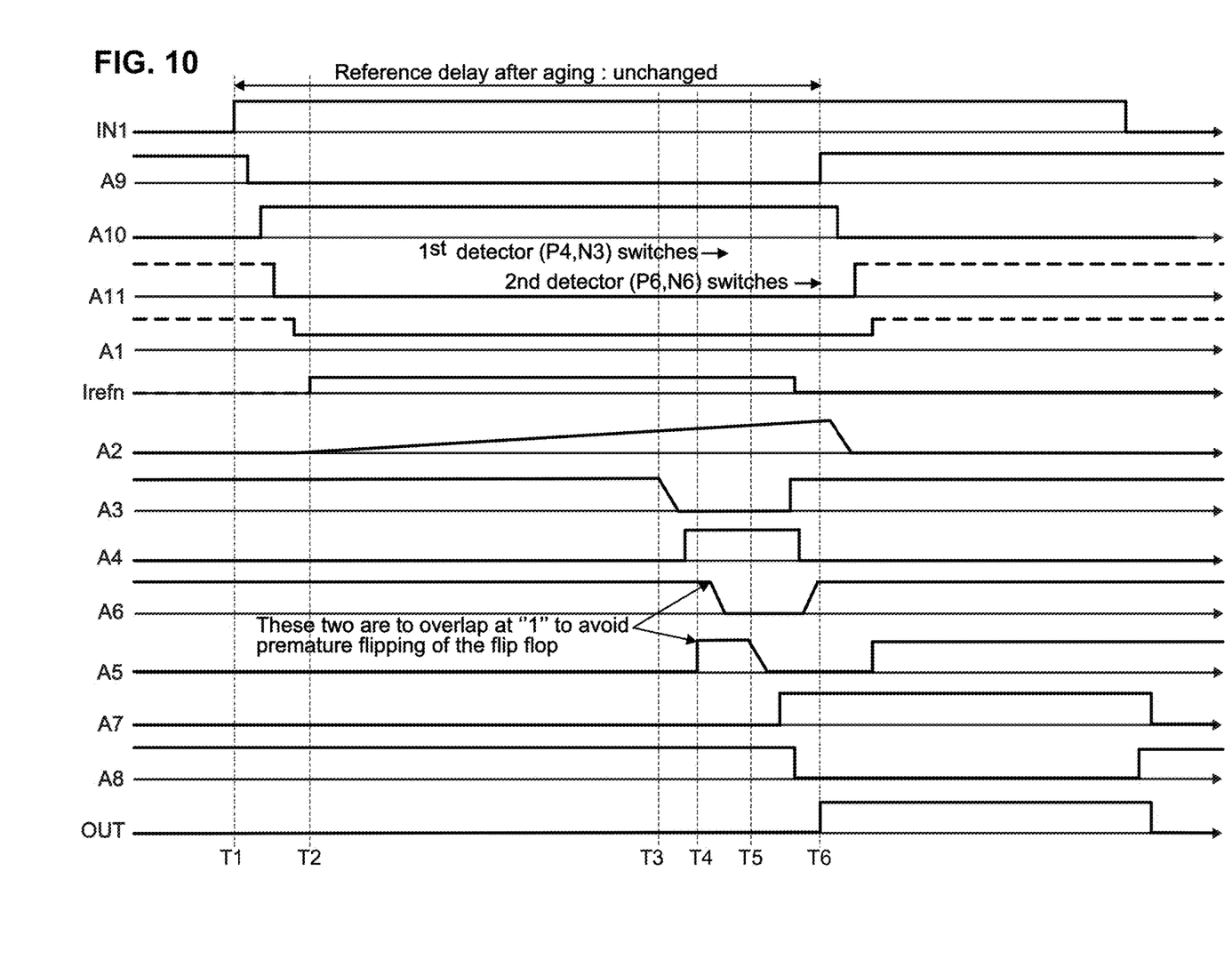
FIG. 10 is a graph showing voltages of nodes of FIG. 9 during operation.

With additional reference to the timing diagram of FIG. 10, operation of the timer 19" and detector circuit 20" of FIG. 9 is now described.

In an initial state, the circuit is in a stable state with the voltage at node A8 at Vdd and the voltage node A7 at ground, which is a valid state for the toggle flip-flop formed by NAND gates ND1 and ND2. When the input IN transitions to the second logic state (e.g., logic 1) at time T1, the inputs of NAND gate ND3 are both at the second logic state (e.g., logic 1), causing its output at node A9 to fall. The output of inverter IV1 at node A10 resultingly transitions to the second logic state (e.g., logic 1) since its input at node A9 is at the first logic state (e.g., logic 0).

With the voltage at node A10 then being at the second logic state (e.g., logic 1), the n-channel transistor N4 turns on, connecting node A11 to ground.

As node A11 is connected to ground, current is sunk from node A1, which in turn causes p-channel transistors P1 and P2 to turn on. With p-channel transistor P2 turned on, a current path is established between the supply voltage and node A2. Capacitor C is connected between node A2 and ground, and therefore, as the current flows through p-channel transistor P2 to node A2, capacitor C begins to charge at time T2, causing the voltage at node A2 to rise. Observe that by this time, the voltage at node A1 has been sunk to Vdd−VtP, turning on p-channel transistors P3 and P1 with a gate to source voltage Vgs equal to VtP, mirroring the current through P1 to cause the voltage IREFN to rise high. Note that this current is also mirrored again in n-channel transistors N5 and N6.

As the voltage at node A2 increases (as a result of the current through p-channel transistor P1 being mirrored through p-channel transistor P2), it approaches the threshold voltage for p-channel transistor P4 (Vdd−Vtp when not aged, or Vdd−VtPa when aged). When the voltage at node A2 reaches the threshold voltage for p-channel transistor P4, the first detector (p-channel transistor P4, n-channel transistor N3) switches, and the voltage at node A3 goes from Vdd to ground, and time T3.

The voltage transition at node A3 causes the output of inverter IV3 to rise, raising the voltage at node A4. With the voltage at node A4 now being raised, p-channel transistor P5 turns on, since its gate-to-source voltage |Vgs| is greater than its threshold voltage VtP. This causes the voltage at node A5 to follow node A4 and rise at time T4.

As the voltage at node A5 rises, the OR gate OR1 asserts its output to the first input of NAND gate ND1, preventing the toggle flip-flop formed by NAND gates ND1 and ND2 from switching. Meanwhile, when the voltage at node A4 rises from ground, p-channel transistor P6 turns off, and n-channel transistor N6 pulls the voltage at node A6 to ground.

Capacitor C continues charging until the voltage at node A2 reaches Vdd−VtP at time T5. At this point, p-channel transistor P5 turns off, causing the voltage at node A5 to fall to ground. Both node A5 and node A6 being at ground causes the output of the OR gate to fall to the first logic state (e.g., logic 0), causing the toggle flip-flop formed by NAND gates ND1 and ND2 to switch, triggering the subsequent operations in the circuit, which are the same as those described above. Note that at time T6, as a result of the switching of the toggle flip-flop formed by NAND gates ND1 and ND2, the output of inverter IV2 rises to the second logic state (e.g., logic 1), and the voltage at node A9 rises, turning on n-channel transistor N2 and therefore discharging the capacitor C to ground.

Throughout this process, the second detector (p-channel transistor P5, n-channel transistor N5) does not age. In particular, p-channel transistor P5 does not age due to NBTI because it does not experience a sufficiently negative gate to source voltage Vgs to meet the NBTI aging conditions. When the voltage at node A2 is sufficiently low (less than Vdd−VtPa), the voltage at node A4 is at 0V, and the gate to source voltage of p-channel transistor P5 is positive, indicating PBTI, which is not an issue in this case.

When the voltage at node A2 is equal to or greater than Vdd−VtPa, the voltage at node A4 is at Vdd, making the gate to source voltage of p-channel transistor P5 greater than−VtPa, with VtPa being the threshold voltage of p-channel transistor P5. In typical scenarios, if the threshold voltage VtP is 0.8V and VtPa is at most 1V, the gate to source voltage of p-channel transistor P5 does not fall below −1V, preventing NBTI aging conditions from occurring in p-channel transistor P5. While p-channel transistor P6 can age, it operates in an on/off mode and receives its gate signal from inverter IV3. As a result, the aging of p-channel transistor P6 does not impact the delay of the delay circuit 19".

Figure 11:
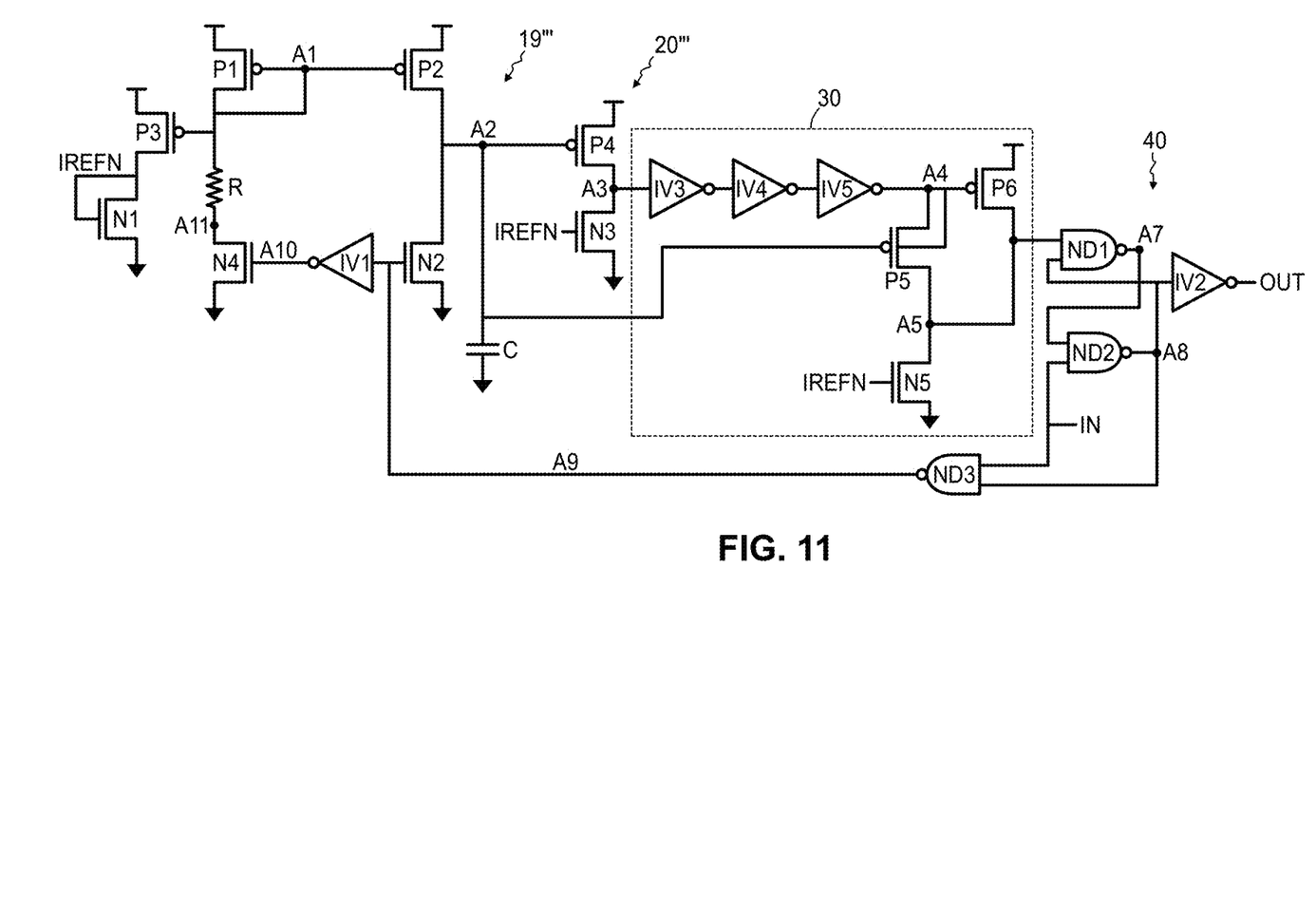
FIG. 11 is a schematic diagram of another timer and associated detector circuit disclosed herein which mitigate the effects of MOS transistor aging.

To further address the issue caused by the aging of p-channel transistor P4, the timer 19'" and detector circuit 20'" of FIG. 11 have been developed in an alternative embodiment. The main difference here over the timer 19'" and detector circuit 20'" of FIG. 7 is the specifics of the aging protection circuit 30 connected between node A3 and the first input of NAND gate ND1.

The timer 19'" includes a diode coupled n-channel transistor N1 connected between the drain of p-channel transistor P3 and ground, with a source of P3 being connected to a supply voltage and a gate of P3 being connected to node A1. A p-channel transistor P1 has its source connected to the supply voltage, its drain connected to node A1, and its gate connected to node A1. A resistor R is connected between nodes A1 and A11. An n-channel transistor N4 has its drain connected to node A11, its source connected to ground, and its gate connected to node A10. A p-channel transistor P2 has its source connected to the supply voltage, its drain connected to node A2, and its gate connected to node A1. An n-channel transistor N2 has its drain connected to node A2, its source connected to ground, and its gate connected to node A9. An inverter IV1 has its input connected to node A9 and its output connected to node A10. A capacitor C is connected between node A2 and ground.

The detector circuit 20'" includes a p-channel transistor P4 with its source connected to the supply voltage, its drain connected to node A3, and its gate connected to node A2. An n-channel transistor N3 has its drain connected to node A3, its source connected to ground, and its gate connected to a reference voltage IREFN generated by the diode coupled transistor N1. The p-channel transistor P4 and n-channel transistor N3 can be considered to form a first detector.

The aging protection circuit 30 is now described and includes three inverters IV3, IV4, and IV5 cascaded between nodes A3 and A4. A p-channel transistor P5 has its source and bulk connected to node A4, its drain connected to node A5, and its gate connected to node A2. An n-channel transistor N5 has its drain connected to node A5, its source connected to ground, and its gate connected to receive the reference voltage IREFN. A p-channel transistor P6 has its source connected to the supply voltage, its drain connected to node A5, and its gate connected to node A4.

P-channel transistor P5 may be a replica of p-channel transistor P4, and n-channel transistor N5 may be a replica of n-channel transistor N3.

A NAND gate ND1 has its first input connected to node A5, its second input connected to node A8, and its output connected to node A7. A NAND gate ND2 has its first input connected to node A7, its second input connected to receive the input IN, and its output connected to node A8. An inverter IV2 has its input connected to node A8 and its output generating the output signal OUT. A NAND gate ND3 has its first input connected to receive the input IN, its second input connected to node A8, and its output connected to node A9.

Figure 12:
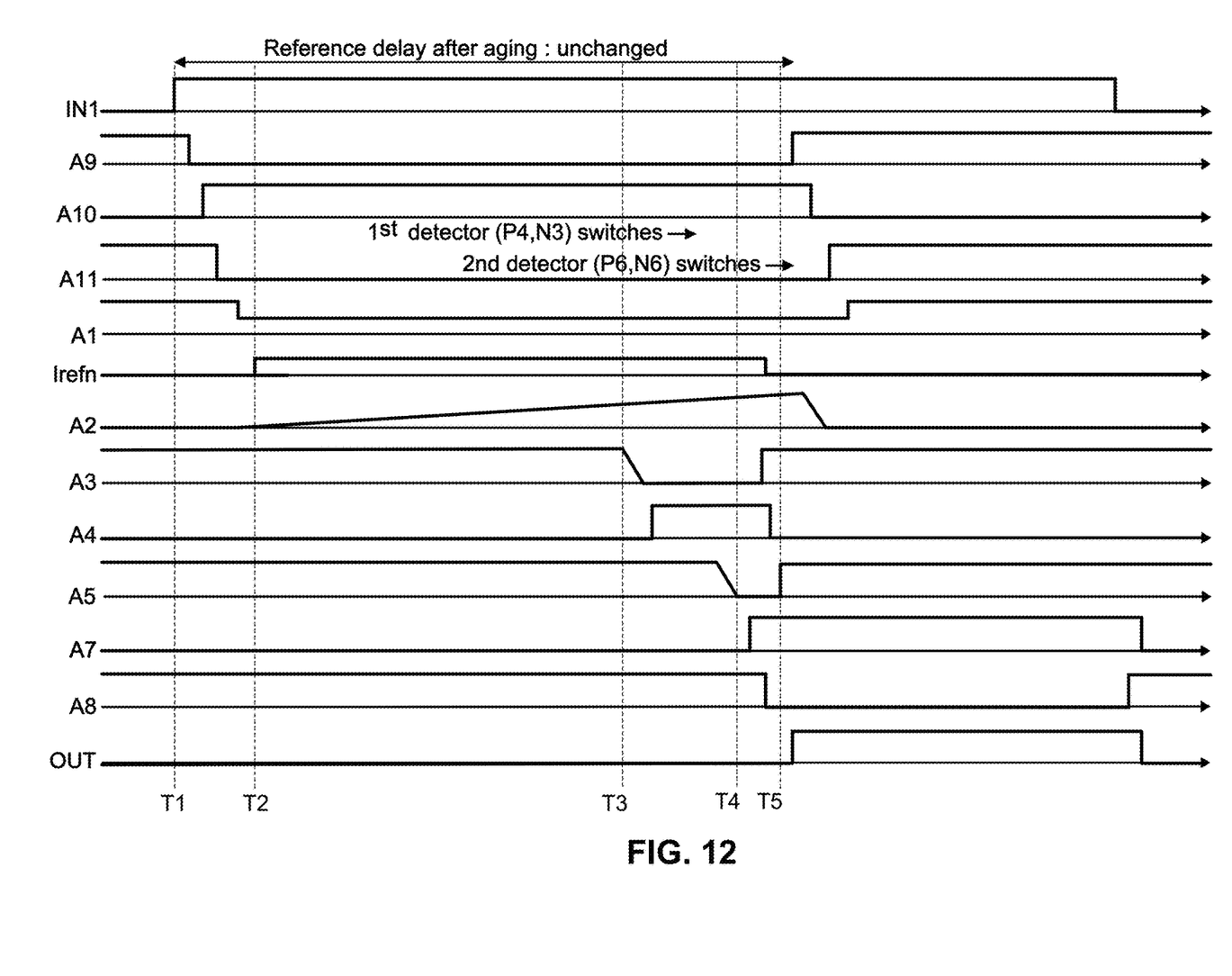
FIG. 12 is a graph showing voltages of nodes of FIG. 11 during operation.

With the benefit of the detailed description of the prior embodiment given above, operation of the timer 19''' and detector circuit 20''' is now described with reference to FIG. 12. In the aged device, as explained in the embodiment above, when the input IN transitions to the second logic state (e.g., a logic 1) at time T1, capacitor C is progressively charged beginning at time T2. Node A3 has an initial voltage at Vdd while node A4 has an initial voltage at ground, and node A5 has been precharged by p-channel transistor P6.

As the device ages, the voltage at node A3 transitions low after time Ta, as shown at time T3, causing inverters IV3, IV4, and IV5 to raise the voltage at node A4 and turn off p-channel transistor P6. The voltage at node A5 could potentially decay due to the pull-down by n-channel transistor N5. Nevertheless, as node A4 rises, the bulk and source of p-channel transistor P5 are raised, causing p-channel transistor P5 to turn on and maintain node A5 at Vdd.

As capacitor C continues to charge, node A2 eventually reaches the supply voltage minus the threshold voltage of the p-channel transistor P5, causing P5 to turn off and node A5 to fall to ground, as shown at time T4. This results in the switching of the toggle flip-flop formed by transistors ND1 and ND2 and subsequent operations as described with reference to FIG. 9. As a result of the switching of the toggle flip-flop formed by NAND gates ND1 and ND2, the output of inverter IV2 rises to the second logic state (e.g., logic 1), and the voltage at node A9 rises, turning on n-channel transistor N2 and therefore discharging the capacitor C to ground, as shown at time T5.

Finally, it is evident that modifications and variations can be made to what has been described and illustrated herein without departing from the scope of this disclosure. For example, another approach can be to isolate the input of the second detector from the input signal, and a signal based upon the input signal is instead imposed at a safe level. In the disabled state therefore, the detector circuit output ignores the detector circuit input because this aging protection prevents signal propagation between the input and the output. For example, in FIG. 9, instead of turning off the power supply of p-channel transistor P5 through node A4, the source and bulk of p-channel transistor P5 are connected to Vdd, and the gate of p-channel transistor P5 is connected to Vdd as long as node A3 is high while the gate of p-channel transistor P5 is connected to node A2 as soon as node A3 goes low (while maintaining inverter IV3, node A4, p-channel transistor P6, and n-channel transistor N6 to avoid parasitic detections).

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A circuit, comprising:
a detector circuit comprising:
a first detector configured to receive an input signal and generate a first detector output signal indicative of the input signal having reached a first activation threshold;
a second detector configured to receive the input signal and, when enabled by the first detector output signal, generate a second detector output signal indicative of the input signal having reached a second activation threshold; and
a logic circuit configured to perform a logical operation on the first and second detector output signals to generate an output indicative of the input signal having reached a voltage equal to the second activation threshold.

2. The circuit of claim 1, wherein the second activation threshold is greater than the first activation threshold due to aging of at least one MOS transistor in the first detector.

3. The circuit of claim 1, wherein the voltage equal to the second activation threshold is a desired voltage level across a capacitor of a timer.

4. The circuit of claim 1, wherein the logic circuit comprises an AND gate configured to perform a logical AND operation on the first and second detector output signals to assert the output indicative of the input signal having reached the voltage equal to the second activation threshold.

5. An EEPROM, comprising:
a timer configured to charge and discharge a capacitor to thereby time an operation; and
the detector circuit of claim 1, with a voltage across the capacitor being the input signal received by the first and second detectors of the detector circuit.

6. The circuit of claim 1,
further comprising a timing circuit configured to charge a capacitor in response to assertion of the input signal;
wherein the detector circuit further comprises:
an aging mitigation circuit comprising:
a first inverter having its input connected to receive the first detector output signal and providing a first inverter output;
the second detector comprising:
a first p-channel transistor having a source and a bulk connected to receive the first inverter output, a drain connected to a first tap node, and a gate connected to receive a voltage on the capacitor; and
a first n-channel transistor having a drain connected to the first tap node, a source connected to ground, and a gate connected to receive a reference voltage;
a second p-channel transistor having a source connected to a supply voltage, a drain connected to a second tap node, and a gate connected to receive the first inverter output; and
a second n-channel transistor having a drain connected to the second tap node, a source connected to ground, and a gate connected to receive the reference voltage;
wherein the logic circuit performs the logical operation on the first and second detector output signals by receiving inputs from the first and second tap nodes and generating an output signal as well as discharging the capacitor based thereupon.

7. The circuit of claim 6,
wherein the first detector comprises:

a third p-channel transistor having a source connected to the supply voltage, a drain connected to a third tap node, and a gate connected to receive the voltage on the capacitor; and a third n-channel transistor having a drain connected to the third tap node, a drain connected to ground, and a gate connected to receive the reference voltage.

8. The circuit of claim 7, wherein the first inverter has its input connected to the third tap node and its output connected to the gate of the second p-channel transistor.

9. The circuit of claim 6, wherein the logic circuit comprises:
an OR gate having a first input connected to the second tap node, a second input connected to the first tap node, and an output;
a first NAND gate having a first input connected to the output of the OR gate, a second input connected to a pre-output node, and an output; and
a second NAND gate having a first input connected to the output of the first NAND gate, a second input connected to receive the input signal, and an output connected to the pre-output node.

10. The circuit of claim 9, wherein the logic circuit further comprises:
a third NAND gate having a first input connected to receive the input signal, a second input connected to the pre-output node, and an output connected to the timing circuit.

11. The circuit of claim 1,
further comprising a timing circuit configured to charge a capacitor in response to assertion of the input signal;
wherein the detector circuit further comprises:
an aging mitigation circuit comprising:
an inverter circuit having its input connected to receive the first detector output signal and providing a first inverter output;
the second detector comprising:
a first p-channel transistor having a source and a bulk connected to receive the first inverter output, a drain connected to a first tap node, and a gate connected to receive a voltage on the capacitor; and
a first n-channel transistor having a drain connected to the first tap node, a source connected to ground, and a gate connected to receive a reference voltage; and
a second p-channel transistor having a source connected to a supply voltage, a drain connected to the first tap node, and a gate connected to receive the first inverter output;

wherein the logic circuit performs the logical operation on the first and second detector output signals by receiving inputs from the first tap node and generating an output signal as well as discharging the capacitor based thereupon.

12. The circuit of claim 11,
wherein the first detector comprises:
a third p-channel transistor having a source connected to the supply voltage, a drain connected to a second tap node, and a gate connected to receive the voltage on the capacitor; and
a third n-channel transistor having a drain connected to the second tap node, a drain connected to ground, and a gate connected to receive the reference voltage.

13. The circuit of claim 11, wherein the inverter circuit comprises a series of cascaded inverters connected between the second tap node and the gate of the second p-channel transistor.

14. A method, comprising:
receiving an input signal at a first detector;
generating a first detector output signal when the input signal reaches a first activation threshold;
enabling a second detector with the first detector output signal and generating a second detector output signal when the input signal reaches a second activation threshold; and
performing a logical operation on the first and second detector output signals to generate an output indicative of the input signal having reached a voltage equal to the second activation threshold.

15. The method of claim 14, wherein the second activation threshold is greater than the first activation threshold due to aging of at least one MOS transistor in the first detector.

16. The method of claim 14, wherein the voltage equal to the second activation threshold corresponds to a desired voltage level across a capacitor of a timer.

17. The method of claim 14, wherein the logical operation performed on the first and second detector output signals is a logical AND operation, and the output indicative of the input signal having reached a voltage equal to the second activation threshold is asserted when both the first and second detector output signals are asserted, the second activation threshold being greater than the first activation threshold due to aging of at least one MOS transistor in the first detector.

* * * * *